(12) United States Patent
Karsten (10) Patent No.: US 11,889,785 B2
(45) Date of Patent: Feb. 6, 2024

(54) WALK-BEHIND LAWNMOWER WITH CUTTING HEIGHT ADJUSTER (71) Applicant: Metalcraft of Mayville, Inc., Mayville, WI (US)

(72) Inventor: Frederik Karsten, Mayville, WI (US)

(73) Assignee: Metalcraft of Mayville, Inc., Mayville, WI (US)

( * ) Notice: Subject to any disclaimer, the term of this patent is extended or adjusted under 35 U.S.C. 154(b) by 350 days.

(21) Appl. No.: 17/236,451

(22) Filed: Apr. 21, 2021

(65) Prior Publication Data

US 2022/0338413 A1    Oct. 27, 2022

(51) Int. Cl.
  *A01D 34/74*    (2006.01)
  *A01D 34/68*    (2006.01)
  *A01D 101/00*   (2006.01)

(52) U.S. Cl.
  CPC ............ *A01D 34/74* (2013.01); *A01D 34/68* (2013.01); *A01D 2101/00* (2013.01)

(58) Field of Classification Search
  CPC ..... A01D 34/68; A01D 34/74; A01D 2101/00
  USPC .......................................................... 56/320
  See application file for complete search history.

(56) References Cited

U.S. PATENT DOCUMENTS

| | | | |
|---|---|---|---|
| 3,292,351 A | 12/1966 | Larson et al. | |
| 3,357,715 A | 12/1967 | Plamper et al. | |
| 4,785,612 A | 11/1988 | Morishita et al. | |
| 4,835,952 A | 6/1989 | McLane | |
| 5,526,633 A | 6/1996 | Strong et al. | |
| 7,013,626 B1 * | 3/2006 | Strope .................. | A01D 34/74 56/15.8 |
| 8,166,737 B2 | 5/2012 | Ninomiya et al. | |
| 8,539,745 B2 | 9/2013 | Schmidt | |

(Continued)

FOREIGN PATENT DOCUMENTS

| | | | |
|---|---|---|---|
| DE | 202016105854 | 12/2016 | |
| EP | 2875710 A1 * | 5/2015 | ............. A01D 34/74 |

(Continued)

OTHER PUBLICATIONS

Scag Power Equipment Operator's Manual for Turf Tiger II, printed Oct. 2019.

(Continued)

*Primary Examiner* — Mahmoud Gimie
(74) *Attorney, Agent, or Firm* — Boyle Fredrickson S.C.

(57) ABSTRACT

A walk-behind lawnmower and accompanying method of use allows for height adjustment of the cutting deck relative to all four wheels simultaneously. This is achieved using a linkage that runs along the cutting deck and that connects the front and rear wheel assemblies. Movement of the entire mechanism is achieved using a lever operatively connected to the linkage. The linkage is retained in place through the use of a locking mechanism. The locking mechanism includes a locking pin, a pin engagement mechanism, such as a lug, provided on the linkage, and an array of pin receptacles spaced longitudinally along the cutting deck. The pin engagement mechanism selectively engages the pin when the pin engages a designated pin receptacle on the cutting deck, retaining the cutting deck at a height determined by the prevailing location of the pin which, in turn, is determined by the selected pin receptacle.

18 Claims, 7 Drawing Sheets

(56) References Cited

U.S. PATENT DOCUMENTS

| | | |
|---|---|---|
| 8,887,480 B2 | 11/2014 | Wadzinski |
| 2021/0105938 A1 * | 4/2021 | Fredenburg .......... A01D 34/283 |

FOREIGN PATENT DOCUMENTS

| | | | |
|---|---|---|---|
| EP | 2875710 | 10/2016 | |
| EP | 3282826 | 10/2020 | |
| EP | 3874933 A1 * | 9/2021 | ............. A01D 34/66 |

OTHER PUBLICATIONS

Scag Power Equipment Illustrated Parts Manual for Turf Tiger II, printed Nov. 2019.

* cited by examiner

WALK-BEHIND LAWNMOWER WITH CUTTING HEIGHT ADJUSTER

FIELD OF THE INVENTION

The invention relates generally to lawn and garden equipment and, in particular, to a walk-behind lawnmower with a height adjustment assembly allowing for the cutting deck to be raised or lowered relative to its wheels.

BACKGROUND OF THE INVENTION

Efforts have been made to reduce manual labor when maintaining healthy and aesthetically pleasing lawns and other landscaping features. This commonly requires regular trimming of grass or similar ground cover foliage using a lawnmower or other similar device. One common type of lawnmower is what is known as a "walk-behind" lawnmower, which is designed for an operator to operate the lawnmower from its rear in an up-right, standing position. The typical walk-behind mower is characterized by a cutting deck or cutter deck that houses one or more rotating blades, a number, most typically four, wheels supporting the cutting deck on the ground, and an elongated handle extending rearwardly from the cutting deck to allow an operator to guide and possibly push the mower. Unlike most riding lawnmowers, walk-behind lawnmowers often include a cutting deck which also acts as the device's frame or chassis. The device's wheels, motor, handle, and cutting blade(s) are all mounted either directly or indirectly to the cutting deck. This is in contrast to most riding lawnmowers, which include a separate frame or chassis from which a cutting deck is suspended. There are several different categories of walk-behind style lawnmowers with some requiring the operator to manually push the lawnmower to propel it forward, while others are self-propelled, in which case the motor also drives wheels.

Grass and other similar ground cover foliage needs to be cut at different heights depending on a multiple of different factors. These factors include lawn typography, local weather and climate, grass or foliage species, and personal preference. Trimming at an incorrect height may cause damage to the lawn, which may result in aesthetically unappealing dead areas where the ground cover foliage will need to be replaced, and possibly rainwater absorption and drainage issues. In most, if not all of such walk-behind lawnmowers, cutting height is adjusted by raising and lowering the cutting deck, and thus the blade(s), relative to the wheels. Some mowers have four-point adjustment requiring adjustment of the height of each wheel relative to the deck. Some have linkages that provide for adjusting the height of the deck relative to two or even all four wheels simultaneously.

Regardless of the mechanism used to adjust cutting height, some mechanism must be employed to lock the cutting deck in a desired position relative to the wheels. The most common-such mechanisms are detent-based mechanism that require that the user release a spring-loaded latch or similar device, hold that latch in its released position against the biasing force during adjustment, and release the latch. All of this must be done while operating a lever that moves the deck up and down. When raising the deck, the lever must be moved against gravity in one motion while the latch is held its retracted position in another motion. This task can be difficult, particularly when raising the deck against gravity. This task can be hindered in many instances by the need to align the latch with a detent against resistance from the lever or an intervening linkage.

The range of height adjustment that is available with these adjustment mechanisms, and/or the number of increments of available adjustment within that range, also can be limited. Typical existing height adjusters are incapable of providing adjustment in increments of less than ½".

The need therefore has arisen to provide a simple, robust, and reliable mechanism for simultaneously adjust the height of a cutting deck of a walk-behind lawnmower relative to all of the mower's wheels.

The need also has arisen to provide a simple and easy to operate a mechanism that permits the retention of the cutting deck of a lawnmower at any of a wide range of cutting depths.

SUMMARY OF THE INVENTION

In accordance with a first aspect of the invention, these needs are met by providing a walk-behind lawnmower that allows for height adjustment of the cutting deck relative to all wheels simultaneously. This is achieved using a linkage that runs along the cutting deck and that is attached to front and rear wheels. The wheels are part of assemblies that include front and rear brackets that pivot relative to the cutting deck. Each pair of front and rear brackets are connected by a link so that they pivot in unison. Movement of the entire mechanism is achieved using a lever connected to one of the rear brackets and conveniently located for a user. The linkage, and thus the cutting deck, are prevented from moving beyond a designated location through the use of a locking mechanism that includes a locking pin, a pin engagement mechanism provided on the linkage, and an array of pin receptacles spaced longitudinally along the cutting deck. The pin engagement mechanism selectively engages the pin when the pin engages a designated pin receptacle on the cutting deck, retaining the cutting deck at a height determined by the prevailing location of the pin which, in turn, is determined by the selected pin receptacle.

The pin receptacles may be located relative to one another so as to permit height adjustment in increments of less than ½ inch and even of ¼" or even less.

The engagement mechanism may be formed from a lug on the linkage, in which case the lug may be configured to abut against the pin.

The pin receptacles may be formed by a serious of upper and lower vertically aligned holes formed in corresponding upper and lower plates on the cutting deck.

The linkage may comprise a metal plate or interconnected plates connecting front and rear brackets on one side of the deck to another. The lever is operatively connected to the plate or plate assembly. In one possible configuration, the lever is attached to or formed integrally with a rear bracket, which surrounds a drive shaft for rear driven wheels of the lawnmower.

In accordance with another aspect of the invention, a method is provided for adjusting the cutting depth of a walk-behind lawnmower, the lawnmower having a cutting deck mounted on front and rear wheels and a handle assembly extending rearwardly from the cutting deck. The method includes moving an adjustment lever, translating a linkage in response to the motion of the adjustment lever, rotating a first front bracket and a first rear bracket co-directionally in response to the translation of the linkage, moving a front link and a rear link in response to the rotation of the first front bracket and first rear bracket, rotating a second front bracket and a second rear bracket co-directionally in response to the motion of the front and the rear links, and moving a cutting deck vertically relative to the wheels in response to the rotation of the brackets. The cutting deck is retained in position by inserting a locking pin into a selected pin receptacle on the cutting deck at a selected one of a plurality of longitudinally spaced locations along the cutting deck, and engaging the locking pin with an engagement mechanism on the linkage to prevent linkage movement that would result in additional downward movement of the cutting deck relative to the wheels.

The engagement mechanism may simply abut against the locking pin, in which case the cutting deck is prevented from being lowered by the locking pin and inhibited from being raised by gravity.

These and other aspects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof.

BRIEF DESCRIPTION OF THE DRAWINGS

An exemplary embodiment of the invention is illustrated in the accompanying drawings in which like reference numerals represent like parts throughout, and in which.

DETAILED DESCRIPTION

Figure 1:
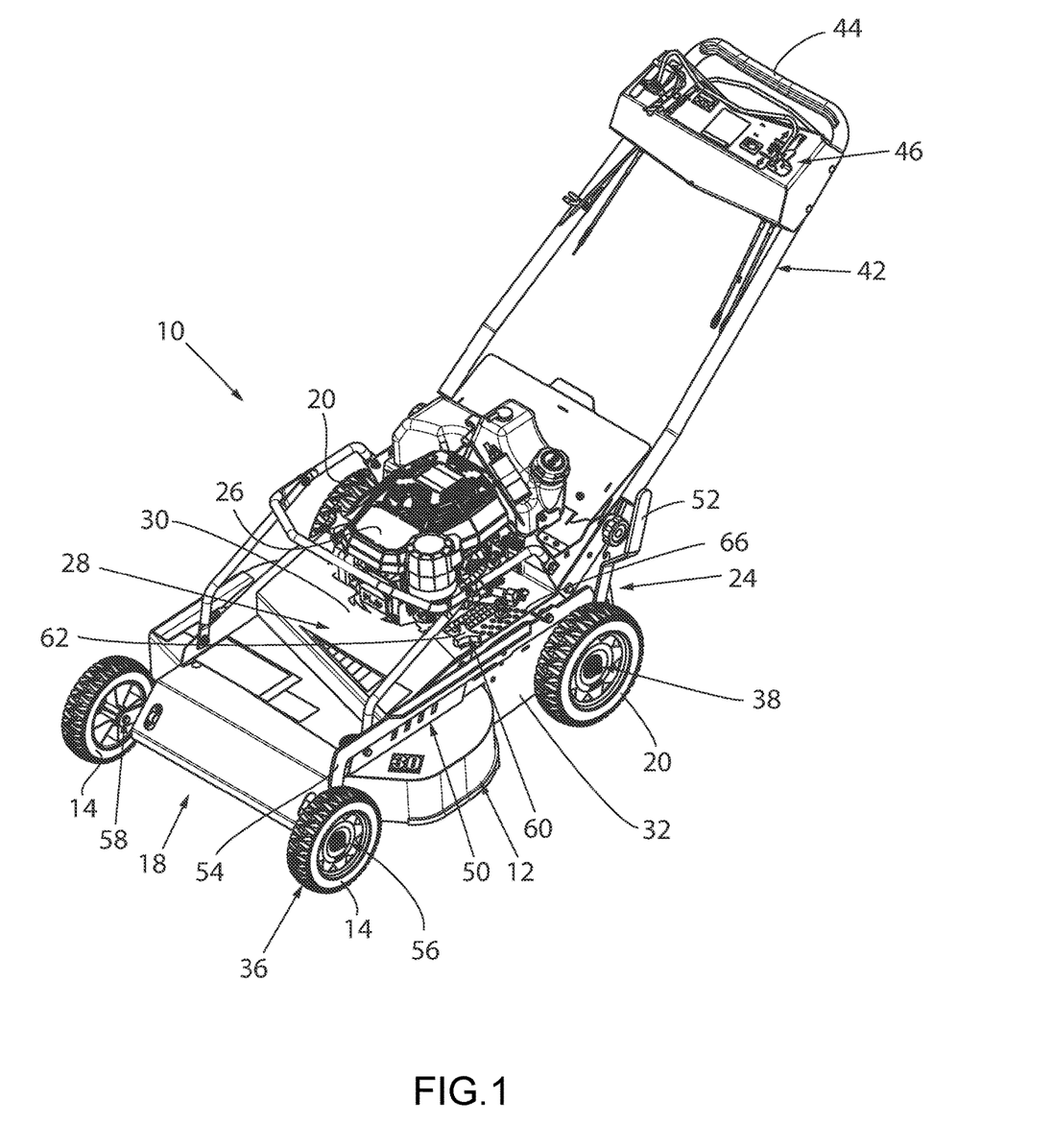
FIG. 1 is a perspective view of the walk-behind lawnmower according to an embodiment of the invention.

Referring now to the drawings and initially to FIG. 1, a walk-behind lawnmower 10 is provided with the ability to adjust the lawnmower's cutting depth using a single lever action and to easily lock a cutting deck in a desired position. The walk-behind lawnmower 10 includes a cutting deck 12, a pair of front wheels 14 positioned on opposed sides of the front portion of the cutting deck 18, and a pair of rear wheels 20 positioned on opposed sides of the rear portion 24. The rear wheels 20 are driven by an engine 2. The engine also drives one more cutting blades (not shown) underneath the cutting deck 12. The illustrated lawnmower 12 is twin-blade mower having two laterally spaced cutting blades. The engine 26 may be a gas-powered engine, as illustrated, or an electric motor. The adjustment mechanism 50 described herein and/or other adjustment mechanism falling within the scope of the present invention are equally applicable to push-mowers without driven wheels Referring to FIGS. 1, 3, and 4, as is typical of walk-behind mowers, the cutting deck 12 forms at least part of a frame or, stated another way, the lawnmower 10 lacks a separate chassis from which the cutting deck 12 is suspended. The engine 26 thus is mounted on a frame or platform 28 mounted on top of and extending behind the cutting deck 12 proper. That platform 28 includes an upper plate 30 for supporting the engine 26, a rear plate 39 (FIG. 4) extending downwardly from the rear end of the upper plate 30, and left and right side plates 32 and 34 extending downwardly from the upper plate 30 behind the cutting deck 12 proper. These side plates support the lawnmower's drive shaft 36 and rear wheel assemblies 38, 40 as described in more details below. Referring again to FIG. 1, a guide handle assembly 42 extends upwardly and rearwardly from the rear portion 24 of the cutting deck 12 to a rear grip portion 44 of the guide handle assembly 42. User controls 46 are mounted on the guide handle assembly 42 near the grip portion 44. These controls 46 may include any or all of an engine speed control, propulsion control(s), and a control for engaging and disengaging the cutting blades.

Figure 2:
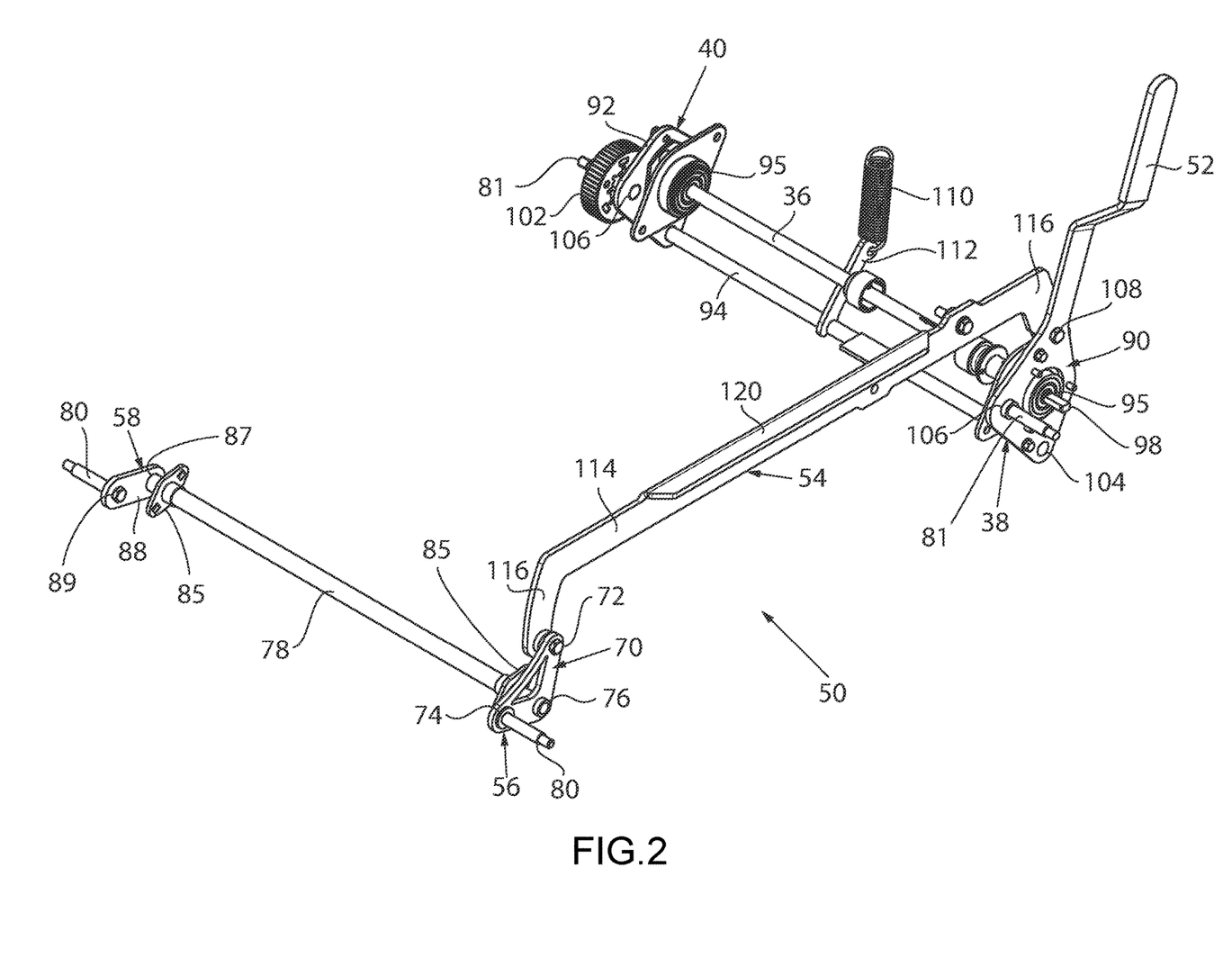
FIG. 2 is perspective view of the adjustment mechanism of the lawnmower of FIG. 1.
Figure 3:
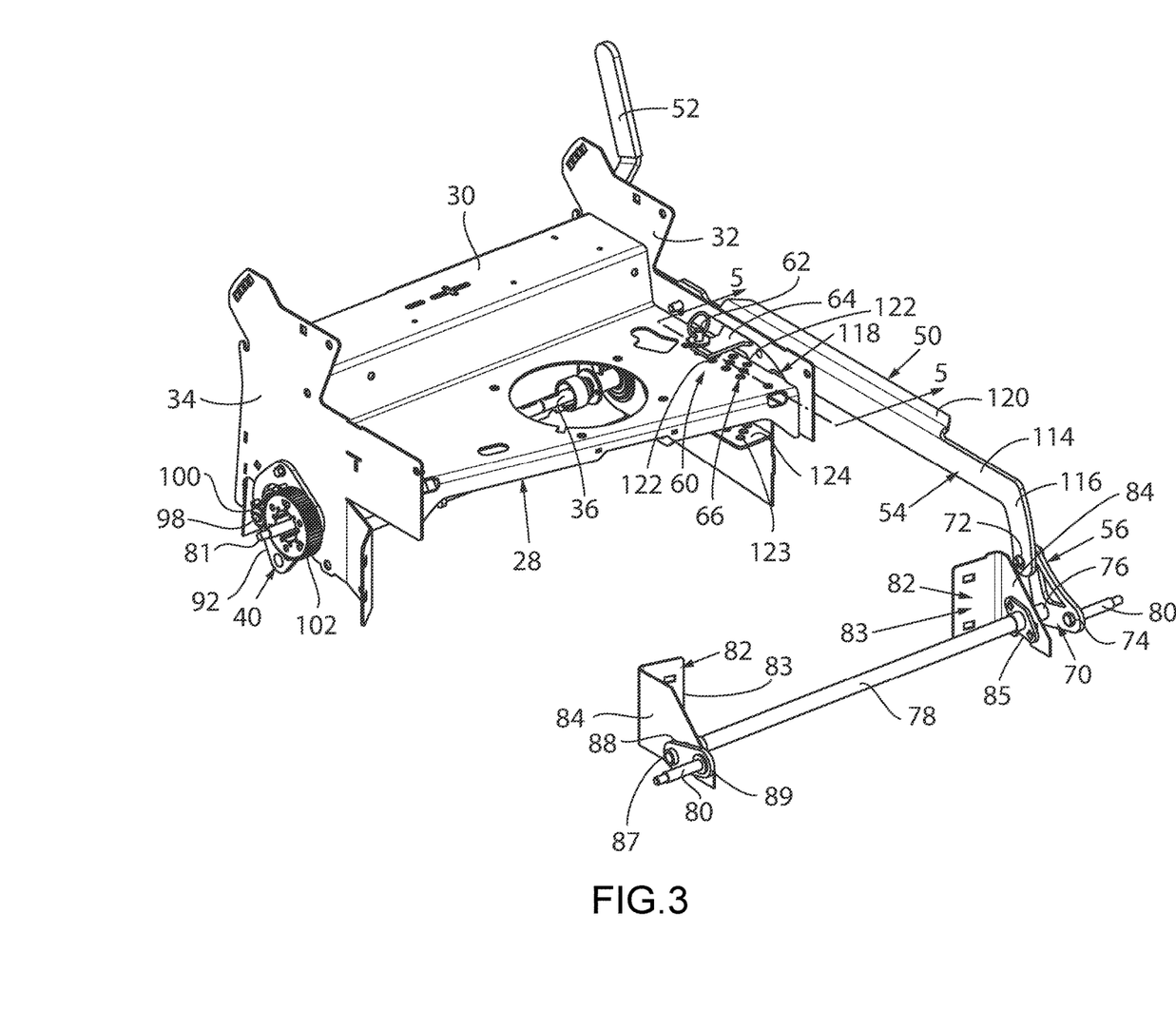
FIG. 3 is a perspective view of the locking mechanism of the lawnmower of FIG. 1 in relation to the adjustment mechanism of FIG. 2.
Figure 4:
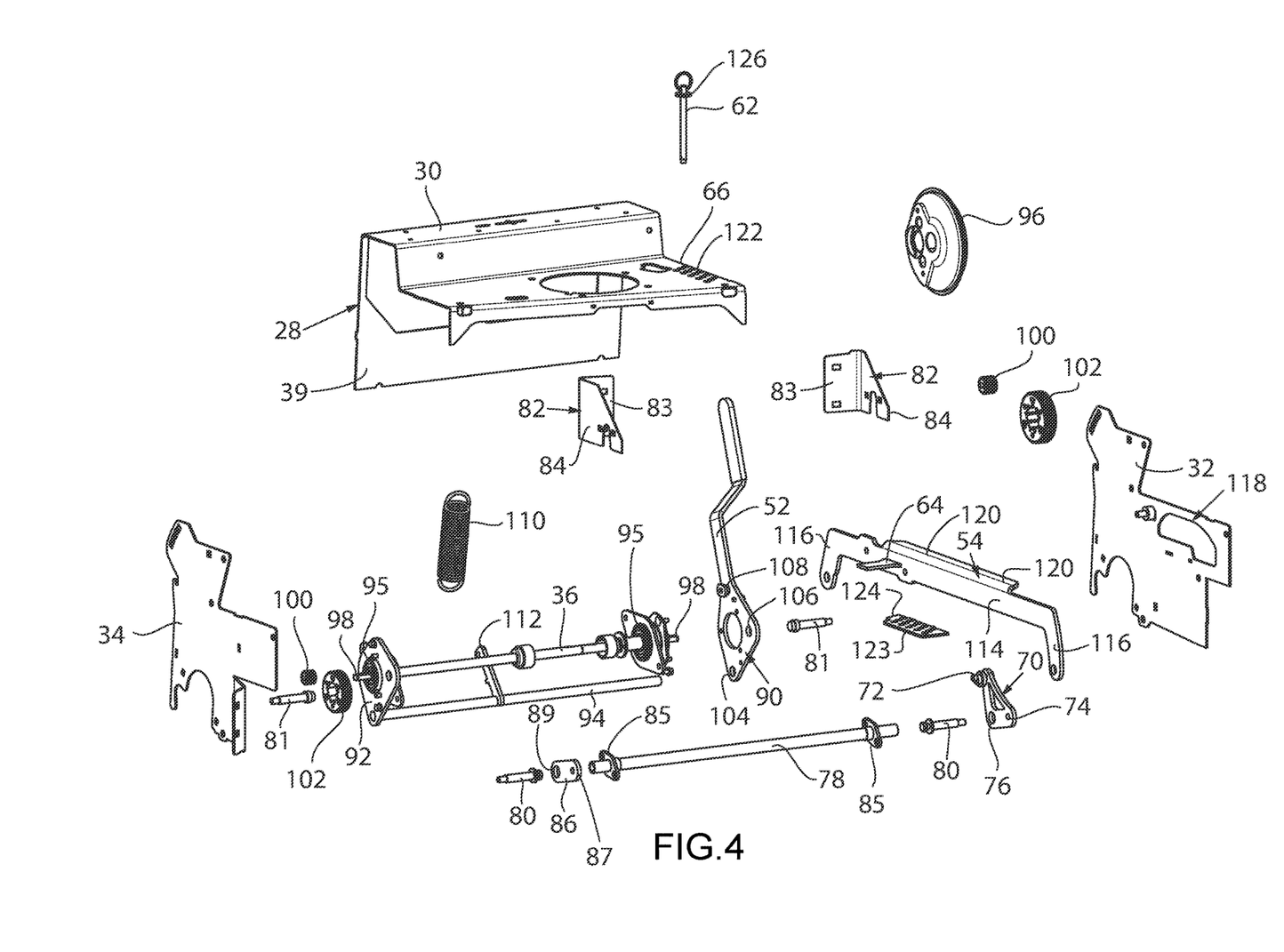
FIG. 4 is an exploded view of FIG. 3.

Centrally framed in FIG. 1 is the cutting depth adjustment mechanism 50 disposed on one side of the cutting deck 12, which is the left side in the illustrated embodiment. The cutting depth adjustment mechanism 50 includes, as its principal components, an adjustment lever 52, a linkage 54 to which the adjustment lever 52 is operatively coupled, and vertically adjustable front and rear wheel assemblies 38, 56. Referring to FIGS. 2-4, and as described in greater detail below, the left side front and rear wheel assemblies 38, 56 are connected to opposing wheel assemblies 40, 58 on the opposite side of the cutting deck 12 and to the linkage 54 such that linkage movement upon handle actuation moves all wheel assemblies 38, 40, 56, 58 simultaneously to raise and lower the entire cutting deck 12 relative to the ground.

Referring to FIGS. 2-5, the cutting depth adjustment mechanism 50 additionally includes a locking mechanism 60 configured to secure the linkage 54 in place relative to the cutting deck 12 and thus maintain the lawnmower's cutting depth during operation. The illustrated locking mechanism 60 includes a locking pin 62, a pin engagement mechanism 64 provided on the linkage 54 and configured to engage with the locking pin 62, and an array of pin receptacles 66 spaced longitudinally along the cutting deck 12 at regular increments. Each of the pin receptacles 66 corresponding to a particular cutting depth of the lawnmower 10. All of these components are described in greater detail below.

Except for being adapted to accommodate the adjustment and locking mechanisms 50, 60 (described below), the cutting deck 12 may be of standard construction and materials. Similarly, the engine 26, wheels 14, 20, and guide handle assembly 42 may be conventional and may be replaced with any number of various types and the invention would still function as intended. This also may include any or all of a number of common features designed for walk-behind lawnmowers, such as one or more discharge chutes and bags to collect clippings. Throughout this detailed description, components are often described as being "pivotally" or "rotatability" connected. It should be understood that bearings, bushings or other similar mechanisms are used to achieve such a relationship.

Referring to FIG. 2, a perspective view of the adjustment mechanism 50 is provided in isolation. The adjustment mechanism's primary function is to impart a pivoting motion to each of the wheel assemblies 38, 46, 40, 58 through movement of the adjustment lever 52, and thus raise or lower the cutting deck 12 in relation to all wheels 14, 20, simultaneously. Referring to FIGS. 2-4, the front left wheel assembly 56 includes a bracket 70 that is generally triangular when viewed from the side, having first 72, second 74, and third 76 mounting locations. The linkage 54 is pivotally connected to the left bracket 70 at the first, or upper/rearmost mounting location 72. The left front wheel 14 is rotatably mounted on a bolt 80 mounted on the second, or forward most mounting location 74. A front link 78 is welded to the bracket 70 at the third or center mounting location 76. That link 78 extends laterally of the deck and is mounted on the cutting deck 12 by first and second L-brackets 82 disposed at opposite sides of the cutting deck 12. As best shown in FIGS. 3 and 4, each L-bracket 82 has mounting holes in a first leg 83 thereof for mounting to cutting deck and additional mounting holes in a second leg 84 thereof. A collar 85 is bolted to mounting holes in the second leg 84 and rotatably supports an associated end of link 78. The opposed, right end of the link 78 extends through a mounting hole formed in a first mounting location 87 on a rear end of a bracket 88 of the front, right wheel assembly 58 as is welded to link 87. The right front wheel 14 is rotatably mounted on a bolt 80 located on a second mounting location 89 on a front end of the bracket 88. Due to this arrangement, pivoting movement of the first bracket 70 is translated through the link 78 to the second bracket 88 to simultaneously raise and lower both front wheels 14 relative to the deck 12.

Referring to FIGS. 2-4, the left rear wheel assembly 38 includes a bracket 90 that is coupled to an opposed bracket 92 of the right rear wheel assembly 40 by a rear link 94 so that the brackets 90, 92 rotate in unison. The rear brackets 90, 92 pivot about a drive shaft 36 that is driven by the engine 26. The drive shaft 36 is supported on opposed bearings 95 supported in openings in the side plates 32 of the platform 30. Each bracket 90, 92 has a central opening surrounding a driven hub 96. Each end of drive shaft 36 extends thorough the hub 96 and is connected to the spindle 98 that, in turn, is coupled to the wheel 20 by first and second gears 100, 102 (the left set of gears is omitted in FIGS. 2 and 3). Each bracket 90, 92 has holes formed in first and second mounting locations 104, 106. The link 94 is mounted in the first, lower mounting location 104, and a stub shaft 81 for supporting the associated wheel 20 is mounted in the second, higher mounting location 106. The linkage 54 is mounted on a third mounting location 108 at the highest mounting location between the drive shaft 36 and handle 52. Due to this arrangement, pivoting movement of the first bracket 90 is translated through the link 94 to the second bracket 92 to simultaneously raise and lower both rear wheels 20 relative to the deck 12. The 94 link may be biased to a position tending to raise the cutting deck 12 by a spring 110 having an upper end connected to the cutting deck 12 and a lower end connected to an arm 112 extending from the central portion of the link 94. If present, the spring 110 provides a counterbalancing force against the weight of the lawnmower 10 and aids an operator in adjusting the cutting depth. This spring 110 is in no way critical to the operation of the adjustment mechanism 50 as a whole. In the current embodiment, the adjustment lever 52 is integrally connected to one of the rear brackets (the left bracket 90 in this embodiment) and configured to rotate the rear bracket 90 when acted upon by an operator. Alternatively, the handle 52 could be a separate member attached to the bracket 90 either directly or indirectly via an intervening linkage.

Referring now to FIGS. 1-4, the linkage 54 extends longitudinally along the left side of the cutting deck 12 between the front and rear brackets 70, 90. It is formed of a single piece of steel, but could be formed from a number of interconnected plates or other members. It includes an upper section 114 extending horizontally along most of the length of the cutting deck 12, and additionally includes front and rear inclined arms 116 extending from the upper section 114 to above-described mounting locations 72, 108 on the front and rear brackets 70, 90. An engagement mechanism 64, described below, extends inwardly from inner surface of the upper section 114 and through an elongated slot 118 on the side plate 32. An upper horizontal flange 120 extends outwardly from a central portion of the upper section to reinforce the linkage 54 against deformation.

Figure 5:
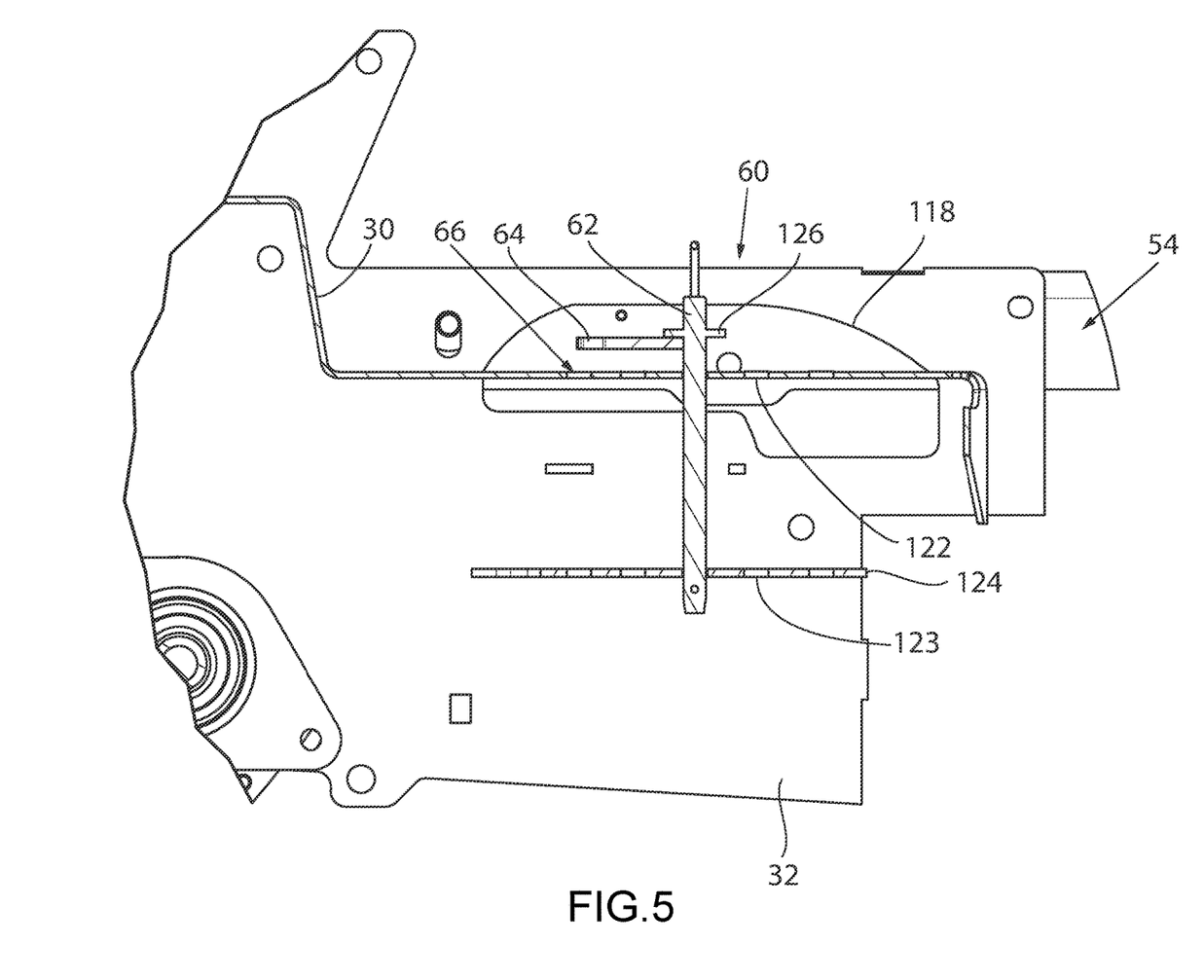
FIG. 5 is a front rear sectional view of the locking mechanism, taken generally along lines A-A in FIG. 3.

FIGS. 3-5 illustrates how the locking mechanism 60 interacts with the adjustment mechanism 50 to secure the linkage 54 in place relative to the cutting deck 12 and thus maintain the lawnmower's cutting depth during operation. As mentioned above, the locking mechanism 60 includes a locking pin 62, a pin engagement mechanism 64 provided on the linkage 54 and configured to engage with the locking pin 62, and an array of pin receptacles 66 spaced longitudinally along the cutting deck 12 at regular increments. Each of the pin receptacles 66 corresponds to a particular cutting depth of the lawnmower.

In the current embodiment, the pin engagement mechanism 64 takes the form of a rectangular lug protruding inwardly and integrally attached to the linkage 54. The slot 118 allows for the lug 64 to move fore and aft and vertically as the cutting deck 12 is raised and lowered.

In the illustrated embodiment, the pin receptacles 66 are spaced so as to permit deck height adjustment in less than ½" vertical increments and, more typically, in increments of ¼" or even less. This fine adjustment is made possible by providing the receptacles 66 in the form of a plurality of laterally-spaced, longitudinally-extending rows, with the receptacles of each row being longitudinally staggered relative to the receptacles of the other rows. Even finer adjustment could be achieved by providing more rows with a smaller stagger between the receptacles 66 of each row. Each row is 4" long, with five spaced receptacles provided in each row. Each receptacle (the first for instance) of each row is offset from the corresponding receptacle of each adjacent row. In order to provide for the desired ¼" height adjustment increments, the hole-to-hole spacing varies throughout the rows due to the complex geometry of the system as a whole. Each receptacle 66 of this embodiment is formed from a pair of upper and lower vertically aligned holes 122 and 123. The upper holes 122 are formed in the upper plate 30 of the platform. The lower holes 123 are formed in a lower plate 124 welded or otherwise affixed to the inside surface of the side plate 32. In use, the locking pin 62 is inserted into a pair of these vertically aligned holes 122, 123 and positioned behind the lug 64 relative to the cutting deck 12. The lug 12 will naturally abut the against the pin 62 due to gravity and prevent motion of the linkage 54 towards the rear of the lawnmower 10 and lowering of the cutter deck 12. Gravitational forces are sufficient to maintain this engagement during normal operation and prevent raising of the cutting deck 12.

Referring now to FIG. 5, a left side sectional view of the adjustment mechanism 50 and locking mechanism 60, taken along line A-A in FIG. 3, is provided. This view provides a better illustration of the particular construction of the locking mechanism 60 in the current embodiment. The relationship between the lug 64 and the slot or opening 118 is shown in full view. The opening 118 is shaped and sized to allow for the lug's full range of motion corresponding to the lawnmower's highest cutting depth to its lowest. In the current embodiment, the opening 118 is oversized, but in other embodiments it could be more restrictive. In the current embodiment, the pin 62 is tapered on one end to allow for easy insertion and has an enlarged head 126 on the other. As shown in this view, the lug 64 makes contact with the locking pin 62 between the two plates 30, 124.

Figure 6:
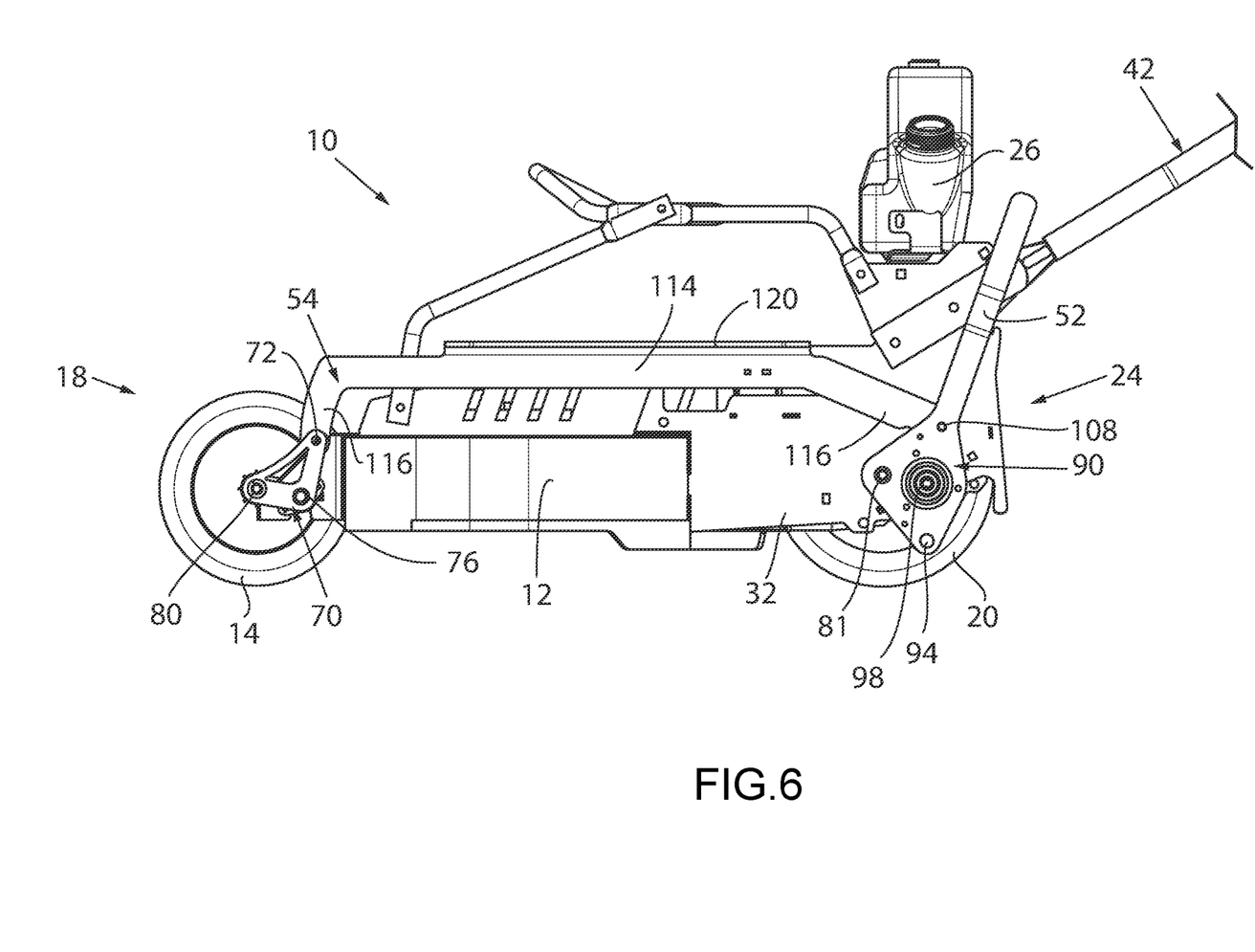
FIG. 6 is a left-side elevation view of the lawnmower of FIG. 1 in its fully raised position.
Figure 7:
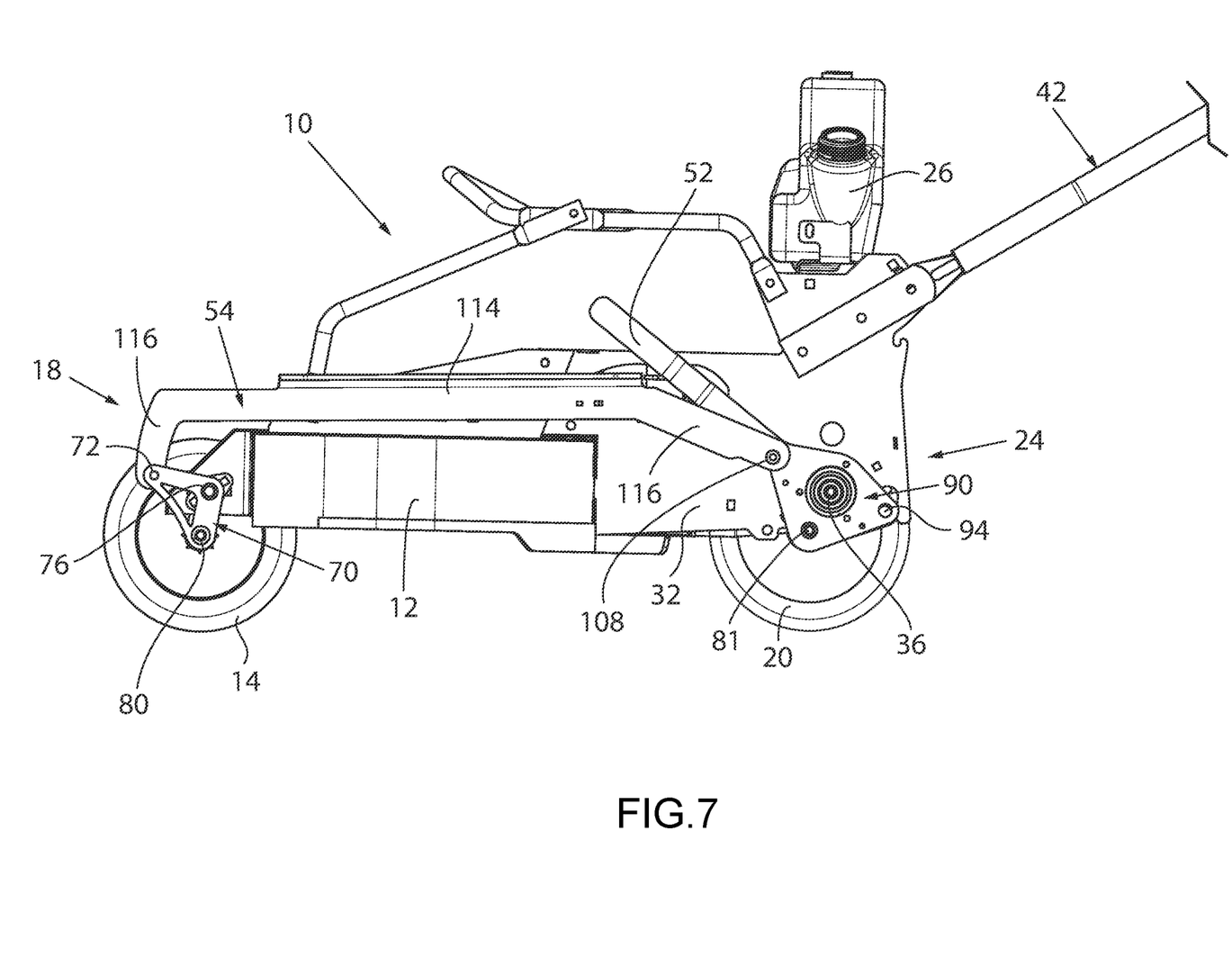
FIG. 7 is a left-side elevation view of the lawnmower of FIG. 1 in its fully lowered position.

Now referring to FIGS. 6-7, a left-side elevation view of the lawnmower 10 is provided in its fully lowered (FIG. 6) and fully raised (FIG. 7) position. The wheels 14, 20 on the left side of the lawnmower 10 have been omitted from these views to better show the positioning and geometry of the adjustment mechanism 50. First referring to FIG. 6, the lever 52 is shown in a substantially upright position with the cutting deck 12 at its lowest height relative to the wheels 14, 20. Gravity acting upon the cutting deck 12 causes the deck 12 to have a natural bias to this state. In contrast, FIG. 7 depicts the adjustment lever 52 inclined and angled towards the front of the lawnmower 10 and the cutting deck 12 at its highest point relative to the wheels 14, 20. The following process describes cutting deck movement from a lowered state to a raised state.

To raise the cutting deck 12 from the relatively low position shown in FIG. 6 to the relatively high position shown in FIG. 7, an operator grips the adjustment lever 52 and pushes it forwardly. The resulting translation of linkage 54 causes the rear bracket 90 to rotate counterclockwise about the centrally located drive shaft 36. This rotation is transmitted to the rear bracket 92 on the opposite side of the cutting deck 12 through the rear link 94 and causes both rear brackets 90, 92 to rotate co-directionally in unison. Because both rear stub shafts 81 and wheels 20 are radially offset from the driveshaft 36, a counterclockwise rotation of the two rear brackets 90, 92 will cause the rear wheels 20 to move downward relative to the cutting deck.

Adjustment lever movement also causes movement of the front brackets 70, 88 through the linkage 54. Forward translation of the linkage 54 causes the front bracket 70 to rotate co-directionally with the rear bracket 90. This movement is transmitted to the front bracket 88 on the opposite side through the front link 78, causing both front brackets 70, 88 to pivot in unison. Because both front bolts 80 and wheels 14 are radially offset from the front link 78, counterclockwise pivoting of the two front brackets 70, 88 will cause the front wheels 14 to move downward relative to the cutting deck 12 and raise the cutting deck 12 from the ground. In summary, a motion of the adjustment lever 52 will cause a corresponding rotation of all the brackets 70, 88, 90, 92, and a simultaneous raising of the wheels 14, 20 of the lawnmower 10 relative to the cutting deck 12 by a common amount.

Linkage translation during this motion also moves the lug 64 away from the locking pin 62, relieving tension from the locking pin 62. The operator than continues to move the adjustment lever 52 towards the front 18 of the lawnmower 10 at or beyond a point at which the desired cutting depth is achieved. At that point, the operator removes the locking pin 62 from its current position and reinserts it into a different pair of vertically aligned holes 122, 123 which, in the example illustrated in FIGS. 6 and 7, would be well in front of the set of holes 122, 123 that originally received the locking pin 62. The operator then simply relieves the lever actuating force sufficiently to allow the cutting deck 12 to fall by gravity to a position in which the lug 64 again engages the locking pin 62, preventing additional downward deck motion. Lastly, the operator simply releases his grip from the adjustment lever 52.

As should be apparent from the above, a similar process is employed to lower the cutting deck 12. The operator simply moves the lever 52 forwardly sufficiently to relieve the tension on the locking pin 62, removes the locking pin 62 and reinserts it into a different pair of holes 122, 123 positioned behind the original pin location, and allows the cutting deck 12 to lower by gravity to a position in which the lug 64 again engages the locking pin 62.

Many changes and modifications could be made to the invention without departing from the spirit thereof. The scope of these changes will become apparent from the appended claims.

What is claimed is:

1. A walk-behind lawnmower comprising:
   a cutting deck having front and rear portions and opposite sides;
   a guide handle assembly extending rearwardly from the rear portion of the deck;
   first and second front brackets pivotally mounted on opposite sides of the front portion of the deck;
   first and second front wheels rotatably mounted on the first and second front brackets, respectively;
   a front link connecting the first and second front brackets to one another so as to cause the first and second front brackets to pivot simultaneously relative to the deck;
   first and second rear brackets pivotally mounted on opposite sides of the rear portion of the deck;
   first and second rear wheels rotatably mounted on the first and second rear brackets, respectively;
   a rear link connecting the first and second rear brackets to one another so as to cause the first and second rear brackets to pivot together relative to the deck;
   a linkage operatively connected to the first front bracket and the first rear bracket so as to be capable of driving the first front bracket and the first rear bracket to pivot together relative to the deck;
   an adjustment lever operatively connected to the linkage; and
   a locking mechanism configured to prevent lowering of the cutting deck beyond a designated height, the locking mechanism comprising:
      a locking pin;
      a pin engagement mechanism provided on and configured to move in unison with the linkage; and
      an array of pin receptacles spaced longitudinally along the cutting deck, the pin engagement mechanism selectively engaging the pin when the pin engages a designated pin receptacle on the cutting deck,
   wherein a movement of the adjustment lever causes the front and rear brackets to pivot co-directionally relative to the cutting deck to raise and lower the deck relative to all four wheels simultaneously.

2. The walk behind lawnmower of claim 1, wherein the pin receptacles are provided in an array of longitudinally extending rows, with the pin receptacles of each row being longitudinally staggered relative to the pin receptacles of the remaining rows.

3. The walk behind lawnmower of claim 1, wherein each pin receptacle includes upper and lower vertically spaced, laterally and longitudinally aligned holes on the cutting deck.

4. The walk behind lawnmower of claim 3, wherein the upper and lower holes of each pin receptacle are formed in a corresponding upper and lower plate on the cutting deck.

5. The walk behind lawnmower of claim 1, wherein the pin engagement mechanism comprises a lug extending laterally inwardly from the linkage.

6. The walk-behind lawnmower of claim 1, wherein the adjustment lever is disposed on the first rear bracket such that a motion of the adjustment lever causes a rotation of the bracket and a translation of the linkage.

7. The walk-behind lawnmower of claim 1, wherein the linkage includes a central portion that extends horizontally and front and rear downwardly inclined end portions that each extend from a respective end of the central portion to a respective one of the front and rear brackets.

8. A walk-behind lawnmower comprising:
a cutting deck having front and rear portions and opposite sides;
a guide handle assembly extending rearwardly from the rear portion of the deck;
first and second front brackets pivotally mounted on opposite sides of the front portion of the deck;
first and second front wheels rotatably mounted on the first and second front brackets, respectively;
a front link connecting the first and second front brackets to one another so as to cause the first and second front brackets to pivot simultaneously relative to the deck;
first and second rear brackets pivotally mounted on opposite sides of the rear portion of the deck;
first and second rear wheels rotatably mounted on the first and second rear brackets, respectively;
a rear link connecting the first and second rear brackets to one another so as to cause the first and second rear brackets to pivot together relative to the deck;
a linkage operatively connected to the first front bracket and the first rear bracket so as to be capable of driving the first front bracket and the first rear bracket to pivot together relative to the deck;
an adjustment lever operatively connected to the linkage; and
a locking mechanism configured to prevent lowering of the cutting deck beyond a designated height, the locking mechanism comprising:
a locking pin;
a pin engagement mechanism provided on the linkage; and
an array of pin receptacles spaced longitudinally along the cutting deck, the pin engagement mechanism selectively engaging the pin when the pin engages a designated pin receptacle on the cutting deck;
wherein:
a movement of the adjustment lever causes the front and rear brackets to pivot co-directionally relative to the cutting deck to raise and lower the deck relative to all four wheels simultaneously;
the pin receptacles are provided in an array of longitudinally extending rows, with the pin receptacles of each row being longitudinally staggered relative to the pin receptacles of the remaining rows; and
the pin receptacles are provided in at least two rows of laterally-spaced rows, with each rows having at least four pin receptacles.

9. A walk-behind lawnmower comprising:
a cutting deck having front and rear portions and opposite sides;
a guide handle assembly extending rearwardly from the rear portion of the deck;
first and second front brackets pivotally mounted on opposite sides of the front portion of the deck;
first and second front wheels rotatably mounted on the first and second front brackets, respectively;
a front link connecting the first and second front brackets to one another so as to cause the first and second front brackets to pivot simultaneously relative to the deck;
first and second rear brackets pivotally mounted on opposite sides of the rear portion of the deck;
first and second rear wheels rotatably mounted on the first and second rear brackets, respectively;
a rear link connecting the first and second rear brackets to one another so as to cause the first and second rear brackets to pivot together relative to the deck;
a linkage operatively connected to the first front bracket and the first rear bracket so as to be capable of driving the first front bracket and the first rear bracket to pivot together relative to the deck;
an adjustment lever operatively connected to the linkage; and
a locking mechanism configured to prevent lowering of the cutting deck beyond a designated height, the locking mechanism comprising:
a locking pin;
a pin engagement mechanism provided on the linkage; and
an array of pin receptacles spaced longitudinally along the cutting deck, the pin engagement mechanism selectively engaging the pin when the pin engages a designated pin receptacle on the cutting deck;
wherein a movement of the adjustment lever causes the front and rear brackets to pivot co-directionally relative to the cutting deck to raise and lower the deck relative to all four wheels simultaneously; and
wherein the pin receptacle are spaced from one another so as to permit height adjustment of the cutting deck in increments of less than ½.

10. The walk behind lawnmower of claim 9, wherein the locations are spaced so as to permit height adjustment of the cutting deck in increments of ¼".

11. A walk-behind lawnmower comprising:
a cutting deck having front and rear portions and opposite sides;
a guide handle assembly extending rearwardly from the rear portion of the deck;
first and second front brackets pivotally mounted on opposite sides of the front portion of the deck;
first and second front wheels rotatably mounted on the first and second front brackets, respectively;
a front link connecting the first and second front brackets to one another so as to cause the first and second front brackets to pivot simultaneously relative to the deck;
first and second rear brackets pivotally mounted on opposite sides of the rear portion of the deck;
first and second rear wheels rotatably mounted on the first and second rear brackets, respectively;
a rear link connecting the first and second rear brackets to one another so as to cause the first and second rear brackets to pivot together relative to the deck;
a linkage operatively connected to the first front bracket and the first rear bracket so as to be capable of driving the first front bracket and the first rear bracket to pivot together relative to the deck;
an adjustment lever operatively connected to the linkage, wherein a movement of the adjustment lever causes the front and rear brackets to pivot co-directionally relative to the cutting deck to raise and lower the deck relative to all four wheels simultaneously; and
a locking mechanism configured to prevent lowering of the cutting deck beyond a designated height, the locking mechanism comprising
a locking pin;
a lug extending laterally inwardly from the linkage, and
an array of pin receptacles that are provided in an array of longitudinally extending rows, wherein the pin receptacles of each row are longitudinally staggered relative to the pin receptacles of the remaining rows, and wherein each pin receptacle defines a unique cutting depth of the cutting deck with the cutting depths being adjustable in increments of less than ½".

12. The walk behind lawnmower of claim 11, wherein the pin receptacles are provided in three rows of laterally-spaced rows, with each row having at last four pin receptacles.

13. The walk behind lawnmower of claim 11, wherein each pin receptacle includes upper and lower vertically spaced, laterally and longitudinally aligned holes on the cutting deck.

14. A method for adjusting the cutting depth of a walk-behind lawnmower, the lawnmower having a cutting deck mounted on front and rear wheels and a handle assembly extending rearwardly from the cutting deck, the method comprising:
   moving an adjustment lever;
   translating a linkage in response to the motion of the adjustment lever;
   rotating a first front bracket and a first rear bracket co-directionally in response to the translation of the linkage;
   moving a front link and a rear link in response to the rotation of the first front bracket and first rear bracket;
   rotating a second front bracket and a second rear bracket co-directionally in response to the motion of the front and the rear links;
   moving a cutting deck vertically relative to the wheels in response to the rotation of the brackets;
   inserting a locking pin into the cutting deck at a selected one of a plurality of longitudinally spaced locations along the cutting deck; and
   engaging the locking pin with a pin engagement mechanism provided on and configured to move in unison with the linkage to prevent linkage movement that would result in additional downward movement of the cutting deck relative to the wheels.

15. The method of claim 14, wherein each pin receptacle comprises upper and lower vertically-spaced holes formed in the cutting deck.

16. A method for adjusting the cutting depth of a walk-behind lawnmower, the lawnmower having a cutting deck mounted on front and rear wheels and a handle assembly extending rearwardly from the cutting deck, the method comprising:
   moving an adjustment lever;
   translating a linkage in response to the motion of the adjustment lever;
   rotating a first front bracket and a first rear bracket co-directionally in response to the translation of the linkage;
   moving a front link and a rear link in response to the rotation of the first front bracket and first rear bracket;
   rotating a second front bracket and a second rear bracket co-directionally in response to the motion of the front and the rear links;
   moving a cutting deck vertically relative to the wheels in response to the rotation of the brackets;
   inserting a locking pin into the cutting deck at a selected one of a plurality of longitudinally spaced locations along the cutting deck; and
   engaging the locking pin with an engagement mechanism on the linkage to prevent linkage movement that would result in additional downward movement of the cutting deck relative to the wheels; and
   wherein the locations are spaced so as to permit height adjustment of the cutting deck in increments of less than ½".

17. The method of claim 16, wherein the locations are spaced so as to permit height adjustment of the cutting deck in increments of no more than ¼".

18. A method for adjusting the cutting depth of a walk-behind lawnmower, the lawnmower having a cutting deck mounted on front and rear wheels and a handle assembly extending rearwardly from the cutting deck, the method comprising:
   moving an adjustment lever;
   translating a linkage in response to the motion of the adjustment lever;
   rotating a first front bracket and a first rear bracket co-directionally in response to the translation of the linkage;
   moving a front link and a rear link in response to the rotation of the first front bracket and first rear bracket;
   rotating a second front bracket and a second rear bracket co-directionally in response to the motion of the front and the rear links;
   moving a cutting deck vertically relative to the wheels in response to the rotation of the brackets;
   inserting a locking pin into the cutting deck at a selected one of a plurality of longitudinally spaced locations along the cutting deck; and
   engaging the locking pin with an engagement mechanism on the linkage to prevent linkage movement that would result in additional downward movement of the cutting deck relative to the wheels; and
   wherein, upon engagement of the locking pin by the engagement mechanism, the cutting deck is restrained from upward movement solely by gravitational forces.

* * * * *